US011969018B2

(12) United States Patent
Park et al.

(10) Patent No.: US 11,969,018 B2
(45) Date of Patent: Apr. 30, 2024

(54) AEROSOL GENERATION DEVICE

(71) Applicant: KT&G CORPORATION, Daejeon (KR)

(72) Inventors: Sang Kyu Park, Hwaseong-si (KR); Seung Won Lee, Gwangmyeong-si (KR); Jong Sub Lee, Seongnam-si (KR)

(73) Assignee: KT&G CORPORATION, Daejeon (KR)

( * ) Notice: Subject to any disclaimer, the term of this patent is extended or adjusted under 35 U.S.C. 154(b) by 708 days.

(21) Appl. No.: 17/050,632

(22) PCT Filed: Oct. 24, 2019

(86) PCT No.: PCT/KR2019/014056
§ 371 (c)(1),
(2) Date: Oct. 26, 2020

(87) PCT Pub. No.: WO2020/122408
PCT Pub. Date: Jun. 18, 2020

(65) Prior Publication Data

US 2021/0235763 A1 Aug. 5, 2021

(30) Foreign Application Priority Data

Dec. 11, 2018 (KR) ........................ 10-2018-0159093

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/51* (2020.01); *A24F 40/57* (2020.01); *H05B 6/105* (2013.01)

(58) Field of Classification Search
CPC ........ A24F 40/465; A24F 40/20; A24F 40/51; A24F 40/57; A24F 40/53; H05B 6/105
(Continued)

(56) References Cited

U.S. PATENT DOCUMENTS 5,613,505 A * 3/1997 Campbell ............... A24F 40/53 131/194
5,649,554 A * 7/1997 Sprinkel ............... A24F 40/465 131/194
(Continued)

FOREIGN PATENT DOCUMENTS

CN 105167203 A 12/2015
CN 106455704 A 2/2017
(Continued)

OTHER PUBLICATIONS

Office Action dated Mar. 28, 2023 in Chinese Application No. 201980028709.3.
(Continued)

*Primary Examiner* — Alexander Gilman
(74) *Attorney, Agent, or Firm* — Sughrue Mion, PLLC

(57) ABSTRACT

According to an embodiment, provided is an aerosol generating device including: a receiving portion accommodating a cigarette through an opening formed at one end of the receiving portion; a first susceptor located in the receiving portion; a second susceptor arranged spaced apart from the first susceptor; a third susceptor arranged spaced apart from the first susceptor and the second susceptor; and a coil that induces an alternating magnetic field so that the first to third susceptors generate heat, wherein whether the cigarette is accommodated is determined based on a first temperature profile of the second susceptor and a second temperature profile of the third susceptor.

14 Claims, 7 Drawing Sheets

(51) Int. Cl.
*A24F 40/51* (2020.01)
*A24F 40/57* (2020.01)
*H05B 6/10* (2006.01)

(58) Field of Classification Search
USPC .......................................................... 131/329
See application file for complete search history.

(56) References Cited

U.S. PATENT DOCUMENTS

| | | | | |
|---|---|---|---|---|
| 11,369,145 | B2* | 6/2022 | Kim | G02B 19/0009 |
| 2016/0057811 | A1* | 2/2016 | Alarcon | A24F 40/50 219/494 |
| 2016/0150825 | A1* | 6/2016 | Mironov | A24F 40/46 219/634 |
| 2017/0027233 | A1* | 2/2017 | Mironov | H05B 1/0244 |
| 2017/0055574 | A1* | 3/2017 | Kaufman | A24F 40/465 |
| 2017/0055575 | A1* | 3/2017 | Wilke | H05B 6/105 |
| 2017/0055580 | A1* | 3/2017 | Blandino | H05B 6/108 |
| 2017/0055582 | A1* | 3/2017 | Blandino | H05B 6/105 |
| 2017/0055584 | A1* | 3/2017 | Blandino | A24F 40/00 |
| 2017/0055587 | A1* | 3/2017 | Zinovik | H05B 6/108 |
| 2017/0055589 | A1* | 3/2017 | Fernando | A24F 40/85 |
| 2017/0079326 | A1* | 3/2017 | Mironov | H05B 6/108 |
| 2017/0086508 | A1* | 3/2017 | Mironov | A24C 5/01 |
| 2017/0105452 | A1* | 4/2017 | Mironov | A24F 40/465 |
| 2017/0119046 | A1* | 5/2017 | Kaufman | H05B 6/105 |
| 2017/0119048 | A1* | 5/2017 | Kaufman | H05B 6/105 |
| 2017/0231278 | A1* | 8/2017 | Mironov | G01F 23/26 392/390 |
| 2018/0070641 | A1* | 3/2018 | Batista | A61M 11/042 |
| 2018/0125119 | A1* | 5/2018 | Cadieux | A24F 40/50 |
| 2018/0168227 | A1* | 6/2018 | Fraser | A24F 40/42 |
| 2018/0184712 | A1* | 7/2018 | Fraser | A24B 15/167 |
| 2018/0184713 | A1* | 7/2018 | Mironov | A24F 40/30 |
| 2018/0184715 | A1 | 7/2018 | Liu | |
| 2018/0192700 | A1* | 7/2018 | Fraser | A24F 40/44 |
| 2018/0214645 | A1* | 8/2018 | Reevell | A24F 40/53 |
| 2018/0289067 | A1* | 10/2018 | Courbat | A24B 15/167 |
| 2018/0310622 | A1* | 11/2018 | Mironov | A24D 1/20 |
| 2018/0310623 | A1* | 11/2018 | Batista | A24F 7/00 |
| 2018/0317554 | A1* | 11/2018 | Kaufman | H05B 6/105 |
| 2019/0008210 | A1* | 1/2019 | Mironov | H05B 6/06 |
| 2020/0054068 | A1* | 2/2020 | Blandino | A24D 1/20 |
| 2020/0305512 | A1 | 10/2020 | Lim et al. | |
| 2022/0087311 | A1* | 3/2022 | Han | A24D 3/17 |

FOREIGN PATENT DOCUMENTS

| | | | |
|---|---|---|---|
| CN | 207653599 | U | 7/2018 |
| CN | 207766584 | U | 8/2018 |
| CN | 108523236 | A | 9/2018 |
| CN | 208192126 | U | 12/2018 |
| EP | 3357359 | A2 | 8/2018 |
| EP | 3 469 936 | A2 | 4/2019 |
| EP | 3 632 240 | A1 | 4/2020 |
| JP | 2006-318660 | A | 11/2006 |
| KR | 10-1776966 | B1 | 9/2017 |
| KR | 10-2018-0033295 | A | 4/2018 |
| KR | 10-2018-0069895 | A | 6/2018 |
| KR | 10-2018-0124739 | A | 11/2018 |
| KR | 10-2018-0129637 | A | 12/2018 |
| WO | 2013/098396 | A2 | 7/2013 |
| WO | 2017/191176 | A1 | 11/2017 |

OTHER PUBLICATIONS

Korean Office Action for 10-2018-0159093 dated, Jun. 18, 2020.
International Search Report for PCT/KR2019/014056 dated, Feb. 5, 2020 (PCT/ISA/210).
Notice of Reasons for Refusal dated Aug. 17, 2021 from the Japanese Patent Office in JP Application No. 2020-543803.
Extended European Search Report dated Dec. 22, 2021 in European Application No. 19895279.8.
Chinese Office Action dated Dec. 20, 2023 in Chinese Application No. 201980028709.3.

* cited by examiner

AEROSOL GENERATION DEVICE

TECHNICAL FIELD

Embodiments relate to aerosol generating devices and aerosol generating methods, and more particularly, relate to aerosol generating devices that determine the temperature of a first susceptor by measuring and comparing temperature profiles of a second susceptor and a third susceptor, and determine whether a cigarette is accommodated.

BACKGROUND ART

Recently, demand for a method of generating an aerosol by heating a tobacco medium in a cigarette, rather than by combusting a cigarette, has increased. Accordingly, research on heating-type cigarettes and heating-type aerosol generating devices has been actively conducted.

There are proposed heating methods different from a method in which a heater formed of an electric resistor is arranged inside or outside a cigarette accommodated in an aerosol generating device, and electric power is supplied to the heater to heat the cigarette. Particularly, research has been actively conducted on a method using a susceptor that generates heat by an external magnetic field. The susceptor is heated by a method in which a current is supplied to a coil provided in an aerosol generating device such that a magnetic field is applied to the susceptor to generate an aerosol.

The susceptor that generates heat due to the magnetic field is included inside or outside a cigarette. Generally, the temperature of a susceptor is measured by indirect measurement when an induction heating means such as a coil is arranged separately from the susceptor in an aerosol generating device. For example, the temperature of a susceptor may be estimated by measuring a current flowing through a coil, a voltage, etc., by raising the temperature of a susceptor to a specific temperature according to the Curie temperature, etc.

However, the above-described methods of measuring the temperature of a susceptor have difficulty in controlling the temperature of the susceptor, because the measurement accuracy of the temperature is low due to variables that may occur by the state of the susceptor and surrounding components. In addition, the method of raising the temperature of the susceptor to a specific temperature according to the Curie temperature has a problem in that it is impossible to set a temperature other than the specific temperature as a target temperature.

In addition, the prior art has difficulty in distinguishing between a case where a cigarette is accommodated in an aerosol generating device and a case where a cigarette is not accommodated. In this case, malfunction of an aerosol generating device may occur because an aerosol generating device operates according to whether a cigarette is accommodated.

In addition, the prior art has difficulty in identifying the type of cigarette. Accordingly, cigarettes are heated with the same temperature profile, not with individual temperature profiles for various types of cigarettes. Therefore, it has been difficult to provide an optimal environment corresponding to each cigarette.

Accordingly, in the present embodiments, provided is a method for increasing the accuracy of measuring the temperature of a susceptor, and for more efficiently operating an aerosol generating device by determining whether a cigarette is accommodated and identifying the cigarette.

DESCRIPTION OF EMBODIMENTS

Technical Problem

Embodiments provide an aerosol generating device and an aerosol generating method capable of determining a temperature of a first susceptor and whether a cigarette is accommodated by comparing temperature profiles of a second susceptor with a third susceptor.

The technical problems to be solved by the present embodiments are not limited to the technical problems as described above, and other technical problems may be driven from the following embodiments.

Solution to Problem

According to an embodiment, provided is an aerosol generating device including: a receiving portion accommodating a cigarette through an opening formed at one end of the receiving portion; a first susceptor located in the receiving portion; a second susceptor arranged spaced apart from the first susceptor; a third susceptor arranged spaced apart from the first susceptor and the second susceptor; and a coil that generates an alternating magnetic field so that the first to third susceptors generate heat, wherein whether the cigarette is accommodated is determined based on a first temperature profile of the second susceptor and a second temperature profile of the third susceptor.

The coil may be wound along a side wall of the receiving portion, the second susceptor may be arranged spaced apart from the first susceptor in a direction toward the other end of the receiving portion, and the third susceptor may be arranged in the side wall of the receiving portion.

The second susceptor may be arranged in a compartment located at the other end of the receiving portion, and The coil may extend toward the compartment and surround a side wall of the compartment.

An aerosol generating device according to another embodiment may further include a first temperature sensor that measures a temperature of the second susceptor and a second temperature sensor for measuring a temperature of the third susceptor.

The first temperature sensor may be arranged spaced apart from the second susceptor, and the second temperature sensor may be arranged spaced apart from the third susceptor.

The first temperature sensor may be arranged to contact the second susceptor, and the second temperature sensor is arranged to contact the third susceptor.

When the cigarette is accommodated in the receiving portion, the first temperature profile of the second susceptor and the second temperature profile of the third susceptor may be different from each other.

A heating rate of the first temperature profile may be higher than a heating rate of the second temperature profile.

The second temperature profile of the third susceptor may differ according to a type of cigarette.

An aerosol generating device according to another embodiment may further include a controller that determines whether the cigarette is accommodated by comparing the first temperature profile with the second temperature profile.

The controller may determine whether to operate the aerosol generating device according to whether the cigarette is accommodated.

An aerosol generating device according to another embodiment may further include a power supply for supplying power to the coil.

An aerosol generating method according to another embodiment includes: generating an alternating magnetic field in a coil; generating heat from a plurality of susceptors by the generated magnetic field; and determining whether a cigarette is accommodated based on a temperature profile of at least one of the plurality of susceptors.

Provided is a computer-readable recording medium having recorded thereon a program for executing the aerosol generating method on a computer.

Advantageous Effects of Disclosure

As the temperature profile of the second susceptor and the temperature profile of the first susceptor are the same, the temperature profile of the first susceptor can be determined by measuring the temperature of the second susceptor. That is, the temperature of the first susceptor can be estimated by measuring the temperature of the second susceptor instead of the first susceptor that is inserted into the cigarette making it difficult to directly measure its temperature.

As the temperature of the first susceptor can be estimated and determined by measuring the temperature of the second susceptor, it can be easier for the aerosol generating device to control the temperature of the first susceptor. Accordingly, heat transferred from the first susceptor to the cigarette can be easily estimated, so that an aerosol and flavor can be more uniformly provided.

BEST MODE

According to an embodiment, provided is an aerosol generating device including: a receiving portion accommodating a cigarette through an opening formed at one end of the receiving portion; a first susceptor located in the receiving portion; a second susceptor arranged spaced apart from the first susceptor; a third susceptor arranged spaced apart from the first susceptor and the second susceptor; and a coil that generates an alternating magnetic field so that the first to third susceptors generate heat, wherein whether the cigarette is accommodated is determined based on a first temperature profile of the second susceptor and a second temperature profile of the third susceptor.

MODE OF DISCLOSURE

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in predetermined cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Terms including an ordinal number such as 'first' or 'second' as used herein may be used to describe various components, but the components should not be limited by the terms. The terms are used only for the purpose of distinguishing one component from other components.

Hereinafter, the present disclosure will now be described more fully with reference to the accompanying drawings, in which exemplary embodiments of the present disclosure are shown such that one of ordinary skill in the art may easily work the present disclosure. The disclosure can, however, be embodied in many different forms and should not be construed as being limited to the embodiments set forth herein.

Figure 1A:
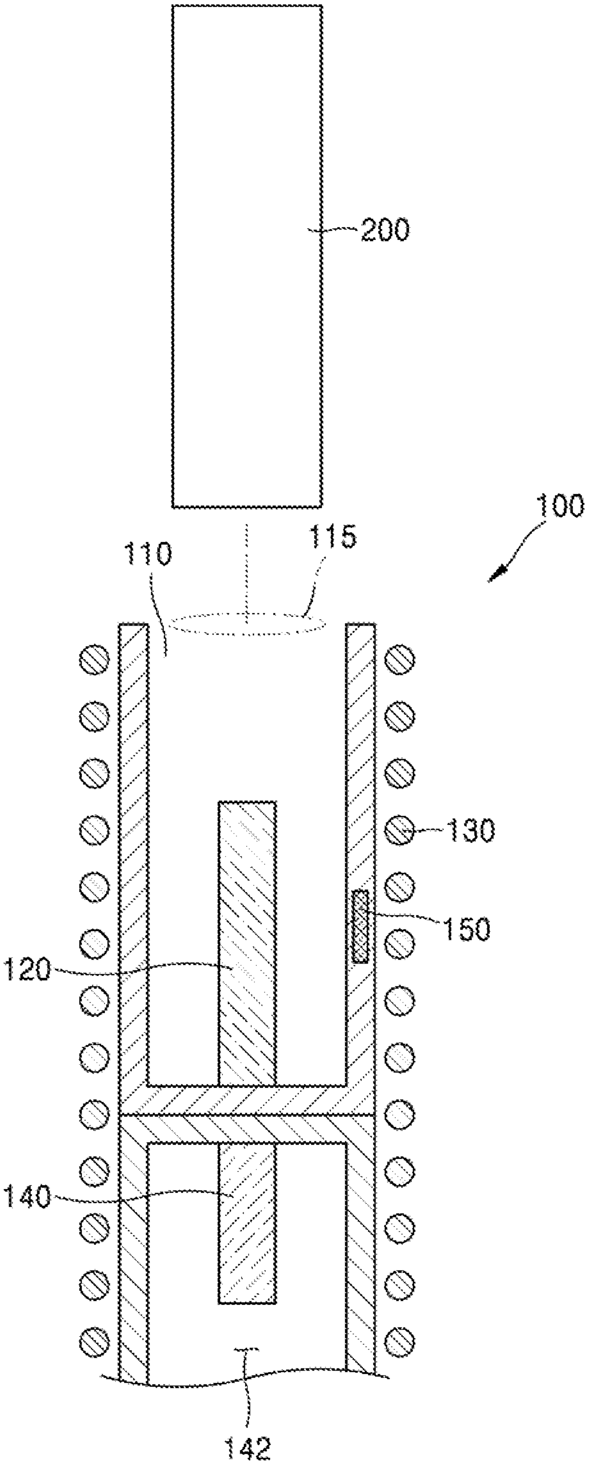
FIG. 1A is a cross-sectional view of a portion including a receiving portion in which a cigarette is accommodated in an aerosol generating device according to an embodiment.
Figure 1B:
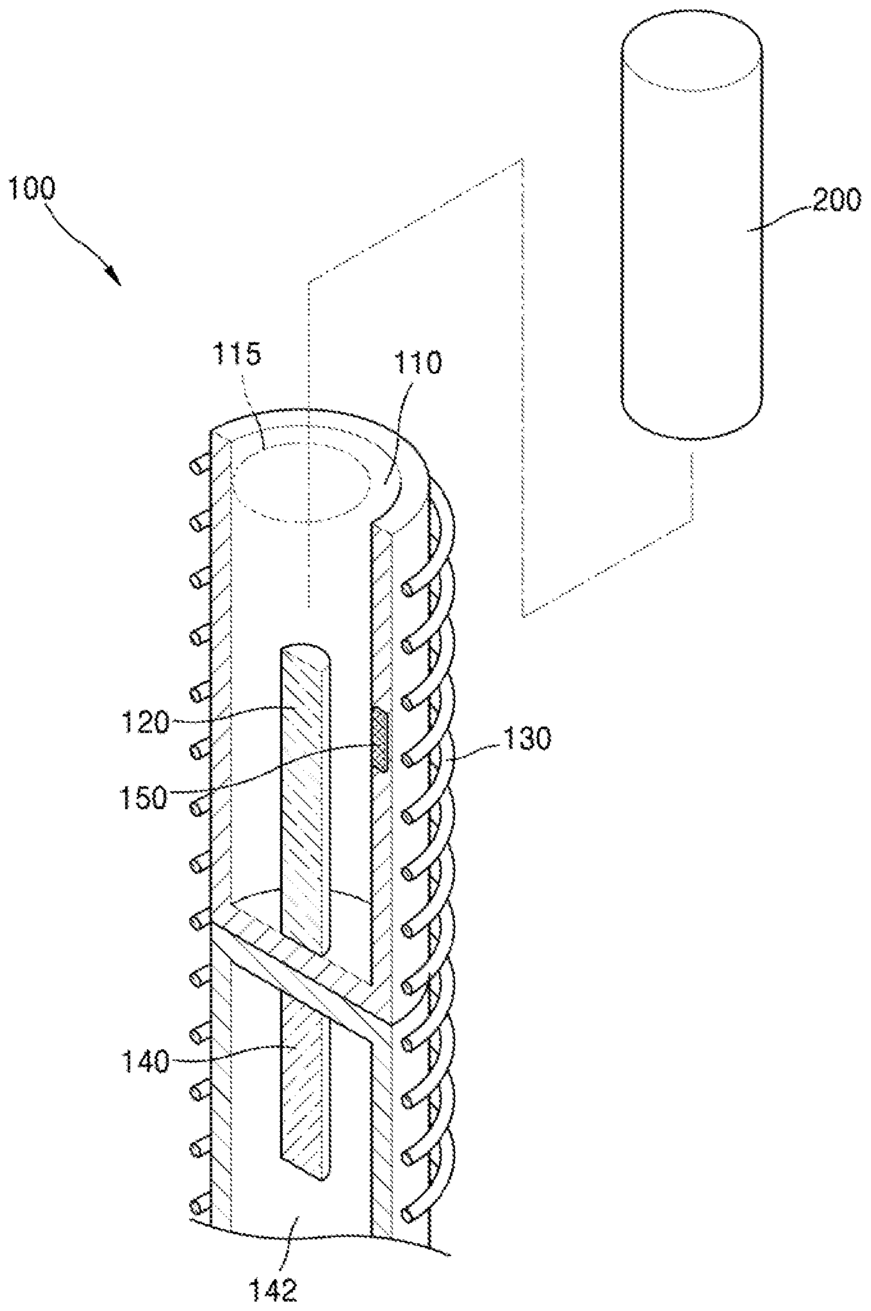
FIG. 1B is a perspective view of a portion of the aerosol generating device according to the embodiment shown in FIG. 1A.

FIG. 1A is a cross-sectional view of a portion including a receiving portion 110 in which a cigarette 200 is accommodated in an aerosol generating device 100 according to an embodiment, and FIG. 1B is a perspective view of a portion of the aerosol generating device 100 according to the embodiment shown in FIG. 1A.

The aerosol generating device 100 according to the embodiment will be described in more detail with reference to FIGS. 1A and 1B.

According to an embodiment, an aerosol generating device 100 includes: a receiving portion 110 accommodating a cigarette 200 through an opening 115 formed at one end of the receiving portion; a first susceptor 120 located in the receiving portion 110; a second susceptor 140 arranged a predetermined distance away from the first susceptor 120; a third susceptor 150 arranged a predetermined distance away from the first susceptor 120 and the second susceptor 140; and a coil 130 that alternately generates a magnetic field so that the first to third susceptors 120, 140 and 150 generate heat, wherein whether the cigarette 200 has been accommodated is determined based on a first temperature profile of the second susceptor 140 and a second temperature profile of the third susceptor 150.

The coil 130 may be wound along a side wall of the receiving portion 110, the second susceptor 140 may be arranged a predetermined distance away from the first susceptor 120 in a direction toward the other end of the receiving portion 110, and the third susceptor 150 may be arranged in the side wall of the receiving portion 110.

An induction heating method may refer to a method of generating heat from the first susceptor 120 by alternately applying a magnetic field whose direction is periodically changed to the first susceptor 120 that is configured to generate heat by an external magnetic field. The aerosol generating device 100 may generate an aerosol by heating the cigarette 200 by the induction heating method.

The aerosol generating device 100 according to the embodiment may include a receiving portion 110 that accommodates the cigarette 200 through an opening 115 formed one end of the receiving portion 110. The opening 115 is formed at one end of the receiving portion 110 such that the cigarette 200 may be accommodated in the receiving portion 110 after being inserted into the receiving portion 110 through the opening 115.

The first susceptor 120 may be located in the receiving portion 110. The first susceptor 120 may be inserted into the cigarette 200 to heat the cigarette 200. One end of the first susceptor 120 may contact a bottom surface of the receiving portion 110, and the other end of the first susceptor 120 may extend in a direction away from the bottom surface of the receiving portion 110. For example, the first susceptor 120 may have an elongate shape extending from the bottom surface of the receiving portion 110 in a direction toward one end of the receiving portion 110, and the first susceptor 120 may have a cylindrical shape, a prismatic shape, or a needle shape, but is not limited thereto.

The aerosol generating device 100 according to the embodiment may include a second susceptor 140 arranged a predetermined distance away from the first susceptor 120. At this time, the second susceptor 140 may be arranged a predetermined distance away from the first susceptor 120 in a direction toward the other end of the receiving portion 110.

The second susceptor 140 may include the same material as the first susceptor 120 so that a temperature profile of the second susceptor 140 corresponds to a temperature profile of the first susceptor 120. That is, since the first susceptor 120 and the second susceptor 140 are include the same material, the first susceptor 120 and the second susceptor 140 may have the same thermal characteristics.

For example, if the first susceptor 120 and the second susceptor 140 are provided with the same magnetic field intensity for the same amount of time, the amount of temperature rise of the second susceptor 140 may be equal to the amount of temperature rise of the first susceptor 120. In addition, the heating rate of the second susceptor 140 may be equal to the heating rate of the first susceptor 120.

As the temperature profile of the second susceptor 140 and the temperature profile of the first susceptor 120 are the same, the temperature profile of the first susceptor 120 may be determined by measuring the temperature of the second susceptor 140. That is, the temperature of the first susceptor 120 may be estimated by measuring the temperature of the second susceptor 140 instead of the first susceptor 120 inserted into the cigarette 200 and thus having a difficulty in direct temperature measurement.

As the temperature of the first susceptor 120 is estimated and determined by measuring the temperature of the second susceptor 140, the temperature of the first susceptor 120 in the aerosol generating device 100 may be more easily controlled. Accordingly, heat transferred from the first susceptor 120 to the cigarette 200 may be easily estimated, so that an aerosol and flavor may be more uniformly provided.

The second susceptor 140 may be arranged in a compartment 142 located at the other end of the receiving portion 110, and the coil 130 may extend toward 142 while also being wound along a side wall of the compartment 142.

The compartment 142 located at the other end of the receiving portion 110 may form a separate space separated from the receiving portion 110. For example, the receiving portion 110 may be a space partitioned to be separated from the receiving portion 110 in the aerosol generating device 100, and the second susceptor 140 may be arranged in the compartment 142. An upper wall of the compartment 142 may contact the bottom surface of the receiving portion 110, and the upper wall of the compartment 142 and the bottom surface of the receiving portion 110 may be integrally formed to form a wall separating the receiving portion 110 and the compartment 142.

The second susceptor 140 may be arranged in the compartment 142, and the second susceptor 140 may extend in a direction away from the upper wall inside the compartment 142. For example, the second susceptor 140 may have an elongate shape extending in a direction away from the upper wall of the compartment 142, and the second susceptor 140 may have a cylindrical shape, a prismatic shape, or a needle shape, but is not limited thereto.

The aerosol generating device 100 according to the embodiment includes a third susceptor 150 arranged a predetermined distance away from the first susceptor 120 and the second susceptor 140. For example, the third susceptor may be arranged in the side wall of the receiving portion 110.

The third susceptor 150 may be arranged in the side wall of the receiving portion 110 such that the third susceptor 150 may be located between one side of the first susceptor 120 and the coil 130. Accordingly, the third susceptor 150 may receive an alternating magnetic field applied by the coil 130.

The third susceptor 150 may extend along at least a portion of the circumference of the side wall in the side wall of the receiving portion 110, and may have a thickness corresponding to the side wall. For example, the third susceptor 150 may be a tubular shape formed along the circumference of the side wall in the side wall of the receiving portion 110, and at least a portion of the first susceptor 120 may be arranged to be surrounded by the third susceptor 150. However, the shape and arrangement of the third susceptor 150 are not limited thereto.

The third susceptor 150 may be made of the same material as the material of the first susceptor 120, but is not limited thereto.

The aerosol generating device 100 according to the embodiment may include the coil 130 that generates an alternating magnetic field so that the first to third susceptors 120, 140, and 150 generate heat. For example, the coil 130 may be wound along the side wall of the receiving portion 110.

The coil 130 is wound along the side wall of the receiving portion 110. The side wall of the receiving portion 110 along which the coil 130 is wound may be a portion corresponding to a length of the first susceptor 120 in the receiving portion 110. That is, the coil 130 may be wound along the side wall such that at least a portion of the first susceptor 120 is surrounded by the coil 130, and the first susceptor 120 may generate heat due to the magnetic field generated by the coil 130.

The coil 130 may generate the alternating magnetic field inside the coil 130 by receiving an alternating current from the device. The first to third susceptors 120, 140 and 150 may generate heat through the magnetic field generated by the coil 130, and the cigarette 200 inserted into the first susceptor 120 may be heated by the heat generated in the first susceptor 120. As the cigarette 200 is heated by the first susceptor 120, an aerosol is generated in the cigarette 200, and then the user may inhale the aerosol.

As the amplitude and frequency of the magnetic field applied to the first to third susceptors 120, 140 and 150 increase, more thermal energy may be released from the first to third susceptors 120, 140 and 150. Accordingly, the aerosol generating device 100 may heat the first susceptor 120 and cause the first susceptor 120 to release thermal energy by applying the magnetic field to the first susceptor 120.

The first susceptor 120, the second susceptor 140, and the third susceptor 150 may all be arranged inside the coil 130. Therefore, when a current flows through the coil 130 and a magnetic field is formed inside the coil 130, the magnetic field is applied to the first susceptor 120, the second susceptor 140 and the third susceptor 150. Accordingly, the first susceptor 120, the second susceptor 140, and the third susceptor 150 generate heat.

The aerosol generating device 100 according to the embodiment determines whether the cigarette 200 has been accommodated by measuring and comparing the first temperature profile of the second susceptor 140 and the second temperature profile of the third susceptor 150.

When the second susceptor 140 and the third susceptor 150 generate heat together with the first susceptor 120, the temperatures of the second susceptor 140 and the third susceptor 150 may be measured, respectively. The first temperature profile of the second susceptor 140 may be data obtained by measuring, storing and digitizing the temperature of the second susceptor 140, and the second temperature profile of the third susceptor 150 may be data obtained by measuring, storing and digitizing the temperature of the third susceptor 150.

The aerosol generating device 100 according to the embodiment may determine whether the cigarette 200 has been accommodated by comparing the first temperature profile of the second susceptor 140 and the second temperature profile of the third susceptor 150.

When the aerosol generating device 100 operates to cause the second susceptor 140 and the third susceptor 150 to generate heat after the cigarette 200 is accommodated in the receiving portion 110 of the aerosol generating device 100, the first temperature profile of the second susceptor 140 is different from the second temperature profile of the third susceptor 150.

Depending on whether the cigarette 200 has been accommodated, the first temperature profile of the second susceptor 140 and the second temperature profile of the third susceptor 150 are different from each other, because heat from the third susceptor 150 is absorbed by the cigarette 200 accommodated in the receiving portion 110 of the aerosol generating device 100.

For example, when the current flows through the coil 130 and the first susceptor 120, the second susceptor 140, and the third susceptor 150 all generate heat, the second susceptor 140 may be arranged a predetermined distance away from the receiving portion 110 in which the cigarette 200 is accommodated, or arranged inside the compartment separated from the receiving portion. Due to the predetermined distance between the second susceptor 140 and the cigarette 200, heat from the second susceptor 140 that is absorbed by the cigarette 200 may be ignored. Therefore, the first temperature profile of the second susceptor 140 may be maintained constant regardless of whether the cigarette 200 has been accommodated.

On the other hand, since the third susceptor 150 is arranged in the side wall of the receiving portion 110 in which the cigarette 200 is accommodated, the third susceptor 150 is located close to the cigarette 200 in the receiving portion 110. Accordingly, when the third susceptor 150 is heated, the second temperature profile of the third susceptor 150 may be changed because from the third susceptor 150 may be absorbed by the cigarette 200. As a result, as shown in FIG. 3B, the heating rate of the second temperature profile may be lower than that of the first temperature profile.

When the cigarette 200 has been accommodated, the first temperature profile of the second susceptor 140 and the second temperature profile of the third susceptor 150 may be different from each other by the above-described effect, and the aerosol generating device 100 according to the embodiment may determine whether the cigarette 200 has been inserted by comparing the first temperature profile of the second susceptor 140 and the second temperature profile of the third susceptor 150.

Based on the determination of whether the cigarette 200 is inserted, malfunction of the aerosol generating device 100 can be prevented. Also, overheating inside the aerosol generating device 100 is prevented, so that the components in the aerosol generating device 100 can be more safely maintained.

The cigarette 200 may be inserted into the aerosol generating device 100 according to the embodiment as shown in FIGS. 1A and 1B. The cigarette 200 inserted into the aerosol generating device 100 according to the embodiment may be a heating-type cigarette 200 well known to those skilled in the art.

Here, as the first susceptor 120 is included in the aerosol generating device 100 according to the embodiment, the cigarette 200 to be inserted into the aerosol generating device 100 may not include a material for the first susceptor 120 or the first susceptor 120. As the first susceptor 120 is included in the aerosol generating device 100 rather than in the cigarette 200, various advantages may be obtained. For example, since there is no need to include the first susceptor 120 in the cigarette 200, the unit price of the cigarette 200 may decrease and the weight of the cigarette 200 may be lighter. In addition, the flavor of the aerosol generated from the cigarette 200 may be provided more uniformly and abundantly.

Figure 2A:
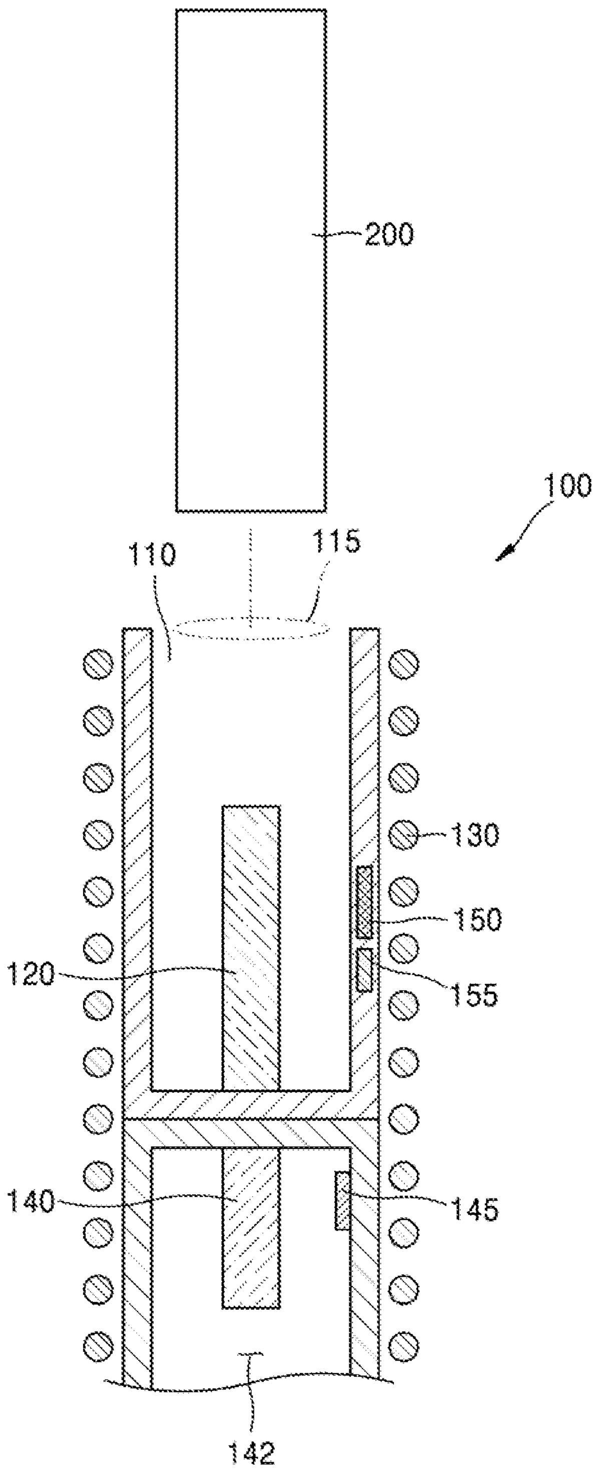
FIG. 2A is a cross-sectional view of a portion including a receiving portion in which a cigarette is accommodated in an aerosol generating device according to another embodiment.
Figure 2B:
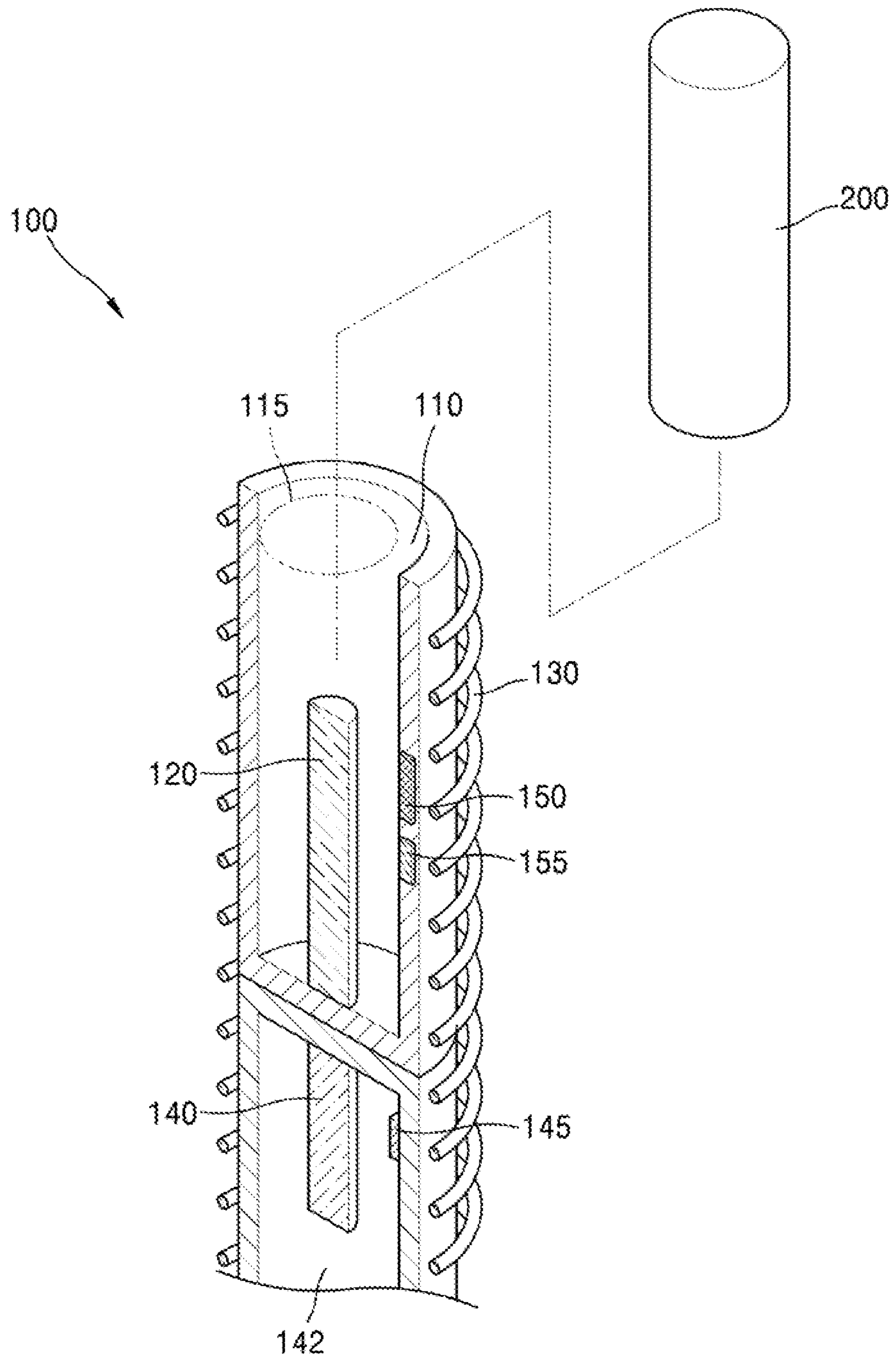
FIG. 2B is a perspective view of a portion of the aerosol generating device according to the embodiment shown in FIG. 2A.

FIG. 2A is a cross-sectional view of a portion including a receiving portion 110 in which a cigarette 200 is accommodated in an aerosol generating device 100 according to another embodiment, and FIG. 2B is a perspective view of a portion of the aerosol generating device 100 according to the embodiment shown in FIG. 2A.

The aerosol generating device 100 according to another embodiment will be described in more detail with reference to FIGS. 2A and 2B.

The aerosol generating device 100 according to another embodiment includes the components of the aerosol generating device 100 according to the embodiment. Since a configuration and effect of components of the aerosol generating device 100 according to another embodiment are the same as the above descriptions, redundant detailed descriptions will be omitted.

The aerosol generating device 100 according to another embodiment may further include a first temperature sensor 145 for measuring the temperature of the second susceptor 140 and a second temperature sensor 155 for measuring the temperature of the third susceptor 150. The first temperature sensor 145 and the second temperature sensor 155 may be of a type that is not affected by the magnetic field induced by the coil 130.

The first temperature sensor 145 may be arranged close to the second susceptor 140. For example, the first temperature sensor 145 may be arranged together with the second susceptor 140 in the compartment 142, and may be mounted on an upper wall or side wall of the compartment 142.

The first temperature sensor 145 may indirectly or directly measure the temperature of the second susceptor 140. The first temperature sensor 145 may be arranged a predetermined distance away from the second susceptor 140, and the first temperature sensor 145 may indirectly measure the temperature of the second susceptor 140.

In this case, the first temperature sensor 145 may be, for example, an infrared (IR) sensor. However, as long as the first temperature sensor 145 is a predetermined distance away from the second susceptor 140 and can indirectly measure the temperature of the second susceptor 140, the type of the first temperature sensor 145 is not limited thereto.

When the temperature of the second susceptor 140 is measured indirectly, the first temperature sensor 145 and the second susceptor 140 need not be directly connected. Therefore, the structure in the aerosol generating device 100 may be simpler.

In order that the first temperature sensor 145 directly measures the temperature of the second susceptor 140, the first temperature sensor 145 may be arranged to contact the second susceptor 140. In this case, the first temperature sensor 145 may be, for example, a resistance temperature detector (RTD) sensor, a negative temperature coefficient of Resistance (NTC) sensor, or a positive temperature coefficient of resistance (PTC) sensor. However, as long as the first temperature sensor 145 contacts the second susceptor 140 and measures the temperature of the second susceptor 140, the type of the first temperature sensor 145 is not limited thereto.

In order that the temperature of the second susceptor 140 is directly measured, the first temperature sensor 145 and the second susceptor 140 need to be directly connected. When the first temperature sensor 145 is directly connected to the second susceptor 140 and measures the temperature of the second susceptor 140, the temperature can be measured accurately and quickly. The first temperature profile of the second susceptor 140 may be recorded and calculated based on the temperature measured by the first temperature sensor 145.

The second temperature sensor 155 may be arranged close to the third susceptor 150. For example, the second temperature sensor 155 may be arranged together with the third susceptor 150 in the side wall of the receiving portion 110 of the aerosol generating device 100.

The second temperature sensor 155 may indirectly or directly measure the temperature of the third susceptor 150. The second temperature sensor 155 may be arranged a predetermined distance away from the third susceptor 150, and the second temperature sensor 155 may indirectly measure the temperature of the third susceptor 150.

In this case, the second temperature sensor 155 may be, for example, an infrared (IR) sensor. However, as long as the second temperature sensor 155 is a predetermined distance away from the third susceptor 150 and can indirectly measure the temperature of the third susceptor 150, the type of the second temperature sensor 155 is not limited thereto. When the temperature of the third susceptor 150 is measured indirectly, the second temperature sensor 155 and the third susceptor 150 need not be directly connected. Therefore, the structure may be simpler.

In order that the second temperature sensor 155 directly measures the temperature of the third susceptor 150, the second temperature sensor 155 may be arranged to contact the third susceptor 150. In this case, the second temperature sensor 155 may be, for example, a resistance temperature detector (RTD) sensor, a negative temperature coefficient of Resistance (NTC) sensor, or a positive temperature coefficient of resistance (PTC) sensor. However, as long as the second temperature sensor 155 contacts the third susceptor 150 and measures the temperature of the third susceptor 150, the type of the second temperature sensor 155 is not limited thereto.

In order that the temperature of the third susceptor 150 is directly measured, the second temperature sensor 155 and the third susceptor 150 may be directly connected. When the second temperature sensor 155 is directly connected to the third susceptor 150 and measures the temperature of the third susceptor 150, the temperature can be measured accurately and quickly. The second temperature profile of the third susceptor 150 may be recorded and calculated based on the temperature measured by the second temperature sensor 155.

Figure 3A:
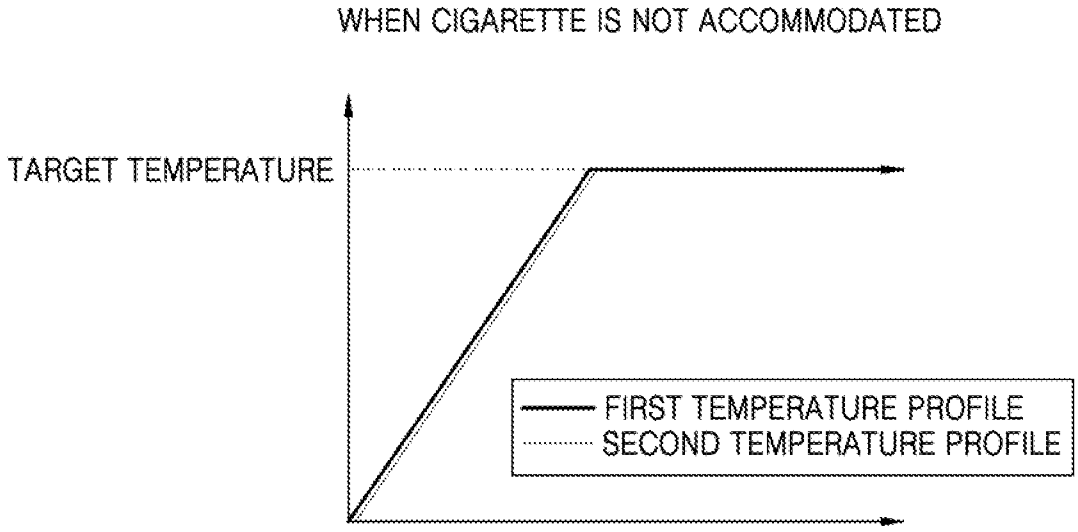
FIG. 3A is a view schematically showing a first temperature profile and a second temperature profile when a cigarette is not accommodated in an aerosol generating device according to an embodiment.
Figure 3B:
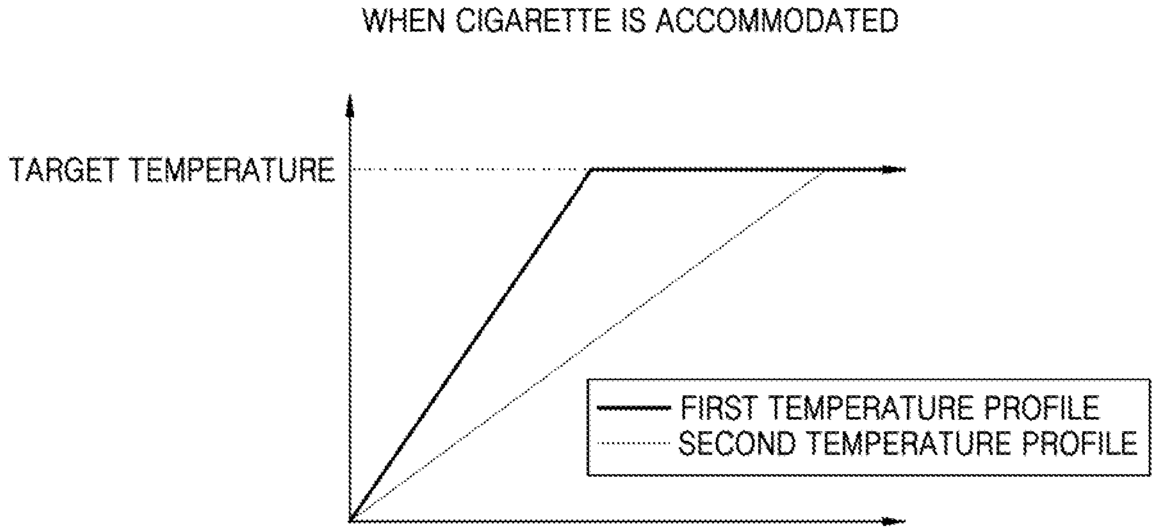
FIG. 3B is a view schematically showing a first temperature profile and a second temperature profile when a cigarette is accommodated in the aerosol generating device according to the embodiment.

FIG. 3A is a view schematically showing a first temperature profile and a second temperature profile when a cigarette 200 is not accommodated in an aerosol generating device 100 according to an embodiment. FIG. 3B is a view schematically showing a first temperature profile and a second temperature profile when a cigarette 200 has been accommodated in the aerosol generating device 100 according to the embodiment.

The first temperature profile of the second susceptor 140 and the second temperature profile of the third susceptor 150 will be described in more detail with reference to FIGS. 3A and 3B.

Referring to FIG. 3A, the first temperature profile of the second susceptor 140 and the second temperature profile of the third susceptor 150, which reach the target temperature when the cigarette 200 is not accommodated, are schematically illustrated. When the cigarette 200 is not accommodated in the aerosol generating device 100, that is, when the receiving portion 110 is empty, the first temperature profile of the second susceptor 140 and the third susceptor 150 may be the same. At this time, the second susceptor 140 and the third susceptor 150 may include the same material and have the same thermal characteristics.

Referring to FIG. 3B, the first temperature profile of the second susceptor 140 and the second temperature profile of the third susceptor 150 that reach the target temperature when the cigarette 200 has been accommodated are schematically illustrated. When the cigarette 200 has been accommodated in the aerosol generating device 100, that is, when the cigarette 200 has been accommodated in the receiving portion 110, the first temperature profile and the second temperature profile may be different from each other.

For example, the first temperature profile may reach the target temperature faster than the second temperature profile. That is, the heating rate of the second susceptor 140 may be higher than the heating rate of the third susceptor 150. In other words, as shown in FIG. 3B, the gradient of the first temperature profile may be greater than the gradient of the second temperature profile before reaching the target temperature.

The first temperature profile of the second susceptor 140 and the second temperature profile of the third susceptor 150 are different from each other when the cigarette 200 has been accommodated in the receiving unit 110. This is because heat from the third susceptor 150 is absorbed by the cigarette 200 accommodated in the receiving portion 110 of the aerosol generating device 100.

For example, when the first susceptor 120, the second susceptor 140, and the third susceptor 150 all generate heat according to the current flowing through the coil 130, the second susceptor 140 may be a predetermined distance away from the receiving portion 110 in which the cigarette 200 is accommodated, or may be arranged inside the compartment 142 separated from the receiving portion 110. Due to the predetermined distance between the second susceptor 140 and the cigarette 200, heat from the second susceptor 140 that is absorbed by the cigarette 200 may be ignored. Therefore, the first temperature profile of the second susceptor 140 may be maintained constant regardless of whether the cigarette 200 has been accommodated.

On the other hand, since the third susceptor 150 is arranged in the side wall of the receiving portion 110 in which the cigarette 200 is accommodated, the third susceptor 150 is located close to the cigarette 200 in the receiving portion 110. Accordingly, when the third susceptor 150 is heated, the second temperature profile of the third susceptor 150 may be changed due to the cigarette 200 absorbing heat from the third susceptor 150.

Accordingly, when the cigarette 200 has been accommodated, the first temperature profile of the second susceptor 140 and the second temperature profile of the third susceptor 150 may be different from each other. Therefore, the aerosol generating device 100 according to the embodiment may determine whether the cigarette 200 has been inserted by comparing the first temperature profile of the second susceptor 140 and the second temperature profile of the third susceptor 150.

The second temperature profile of the third susceptor 150 may be changed according to the type of the cigarette 200 accommodated in the aerosol generating device 100. When the third susceptor 150 is heated, heat from the third susceptor 150 may be absorbed by the cigarette 200. The heat absorbed to the cigarette 200 may differ according to the type of the cigarette 200.

For example, the thickness, porosity, heat transfer rate, etc. of a wrapper surrounding the cigarette 200 may differ according to the type of the cigarette 200. Due to such factors that differ according to the type of the cigarette 200, the amount and the absorption rate of heat absorbed by the cigarette 200 from the third susceptor 150 may vary. Accordingly, the second temperature profile of the third susceptor may differ according to the type of the cigarette 200.

The aerosol generating device 100 may store data for a second temperature profile of the third susceptor 150 according to the cigarette 200 that can be inserted into the aerosol generating device 100. The type of the cigarette 200 may be identified by comparing the data for the stored temperature profile with the second temperature profile being measured.

By identifying the type of the cigarette 200 by the aerosol generating device 100, the aerosol generating device 100 may perform individual temperature control corresponding to the type of each cigarette 200. The aerosol generating device 100 can provide an optimal aerosol generation environment to each of various types of cigarettes 200 through the individual temperature control corresponding to the types of cigarettes 200, thereby further improving a flavor of the aerosol generated.

Figure 4:
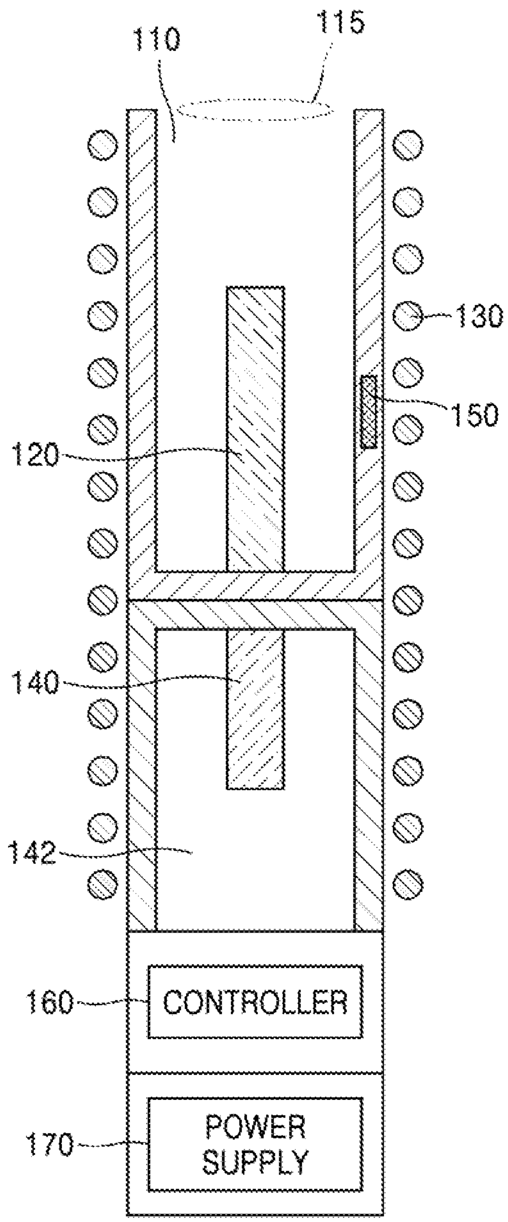
FIG. 4 is a cross-sectional view of an aerosol generating device which further comprises a controller 160 and a power supply 170, according to another embodiment.

FIG. 4 is a cross-sectional view of an aerosol generating device 100 which further comprises a controller 160 and a power supply 170, according to another embodiment.

The aerosol generating device 100 according to the present embodiment may further include a controller 160 that determines whether the cigarette 200 has been accommodated by comparing the first temperature profile of the second susceptor 140 and the second temperature profile of the third susceptor 150, and a power supply 170 that supplies power to the coil 130.

Since the aerosol generating device 100 according to the present embodiment may include the same components as those included in the aerosol generating device 100 according to the above-described embodiment, and the structures and effects of the components are the same as described above, redundant detailed descriptions will be omitted.

The controller 160 may control the power supplied to the coil 130. The controller 160 may determine the temperature of the first susceptor 120 based on the first temperature profile of the second susceptor 140 and the second temperature profile of the third susceptor 150.

In addition, by comparing the first temperature profile of the second susceptor 140 and the second temperature profile of the third susceptor 150 to each other, the controller 160 may determine whether the cigarette 200 has been accommodated, and may determine whether to operate the aerosol generating device 100 according to whether the cigarette 200 has been accommodated. As such, malfunction of the aerosol generating device 100, overheating, and the like can be prevented.

The controller 160 may prestore data for a second temperature profile of the third susceptor 150 according to the cigarette 200 that can be inserted into the aerosol generating device 100, and identify the type of the cigarette 200 inserted into the aerosol generating device 100 by comparing the prestored data with data for the second temperature profile measured from the third susceptor 150 when the aerosol generating device 100 is operating. Here, the advantage that can be obtained by identifying the type of the cigarette 200 are described above, so redundant detailed descriptions will be omitted.

The controller 160 may adjust at least one of the amplitude and frequency of the alternating magnetic field applied to the first susceptor 120, the second susceptor 140, and the third susceptor 150 by controlling the power supplied to the coil 130.

By adjusting the at least one of the amplitude and frequency of the alternating magnetic field applied to the first susceptor 120, the second susceptor 140, and the third susceptor 150, thermal energy emitted from the first susceptor 120, the second susceptor 140 and the third susceptor 150 may be adjusted. Therefore, the controller 160 may control the power supplied to the coil 130 to control the temperature at which the cigarette 200 is heated. At this time, the power control of the coil 130 may be based on the first temperature profile of the second susceptor 140 and the second temperature profile of the third susceptor 150.

The power supply 170 supplies power used for the aerosol generating device 100 to operate. For example, the power supply 170 may supply power so that the first susceptor 120, the second susceptor 140, and the third susceptor 150 be heated, and may supply power required for the control unit 160 to operate. In addition, the power supply 170 may supply power required for a display, sensor, motor, and the like installed in the aerosol generating device 100 to operate, but is not limited thereto, and may supply power to each component.

The aerosol generating devices 100 according to the present embodiments may determine whether the cigarette 200 has been inserted by comparing the first temperature profile of the second susceptor 140 with the second temperature profile of the third susceptor 150. As such, malfunction of the aerosol generating device 100 can be prevented. Also, overheating inside the aerosol generating device 100 is prevented, and the components in the aerosol generating device 100 can be safely maintained.

Also, the aerosol generating devices 100 according to the present embodiments may identify the type of the cigarette 200 by comparing the data for the stored temperature profile with the second temperature profile measured. By identifying the type of the cigarette 200, the aerosol generating device 100 may perform individual temperature control corresponding to the type of each cigarette 200. Accordingly, it is possible to provide an optimal aerosol generation environment for each of the various types of cigarettes 200 and to further improve the flavor of the aerosol generated.

An aerosol generating method according to the present embodiment includes alternately generating a magnetic field in a coil 130, generating heat from a plurality of susceptors 120, 140 and 150 by the generated magnetic field, and determining whether a cigarette 200 has been accommodated based on the temperature profile of some of the susceptors 120, 140 and 150 from which the heat is generated.

Since a configuration and effect of the method of generating an aerosol according to the present embodiment are the same as the configuration and effect of the aerosol generating device according to the previously-described embodiment, redundant detailed descriptions will be omitted.

Meanwhile, the above-described method may be implemented as a program executable on a computer, and may be implemented on a general-purpose digital computer that operates the program using a computer-readable recording medium. In addition, the structure of data used in the above-described method may be recorded on a computer-readable recording medium through various means. The computer-readable recording medium includes a storage medium such as a magnetic storage medium (for example, ROM, RAM, USB, floppy disk, hard disk, etc.), optical read media (for example, CD-ROM, DVD, etc.).

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generating device comprising:
- a receiving portion configured to accommodate a cigarette through an opening formed at one end of the receiving portion;
- a first susceptor located in the receiving portion;
- a second susceptor arranged spaced apart from the first susceptor;
- a third susceptor arranged spaced apart from the first susceptor and the second susceptor;
- a coil configured to generate an alternating magnetic field such that the first to third susceptors generate heat; and
- a controller configured to determine whether the cigarette is accommodated based on a first temperature profile of the second susceptor and a second temperature profile of the third susceptor, wherein the third susceptor is arranged in the side wall of the receiving portion.

2. The aerosol generating device of claim 1, wherein
- the coil is wound along a side wall of the receiving portion,
- the second susceptor is arranged spaced apart from the first susceptor in a direction toward the other end of the receiving portion.

3. The aerosol generating device of claim 1, wherein
- the second susceptor is arranged in a compartment located at the other end of the receiving portion, and
- the coil extends toward the compartment and surrounds a side wall of the compartment.

4. The aerosol generating device of claim 1, further comprising
- a first temperature sensor configured to measure a temperature of the second susceptor; and
- a second temperature sensor configured to measure a temperature of the third susceptor.

5. The aerosol generating device of claim 4, wherein the first temperature sensor is arranged spaced apart from the second susceptor, and the second temperature sensor is arranged spaced apart from the third susceptor.

6. The aerosol generating device of claim 4, wherein the first temperature sensor is arranged to contact the second susceptor, and the second temperature sensor is arranged to contact the third susceptor.

7. The aerosol generating device of claim 1, wherein when the cigarette is accommodated in the receiving portion, the first temperature profile and the second temperature profile are different from each other.

8. The aerosol generating device of claim 7, wherein a heating rate of the first temperature profile is higher than a heating rate of the second temperature profile.

9. The aerosol generating device of claim 1, wherein the second temperature profile differs according to a type of the cigarette.

10. The aerosol generating device of claim 1, the controller determines whether the cigarette is accommodated by comparing the first temperature profile with the second temperature profile.

11. The aerosol generating device of claim 10, wherein the controller determines whether to operate the aerosol generating device according to whether the cigarette is accommodated.

12. The aerosol generating device of claim 1, further comprising a power supply configured to supply power to the coil.

13. An aerosol generating method comprising:
- generating an alternating magnetic field in a coil;
- generating heat from a plurality of susceptors by the generated magnetic field, wherein the plurality of susceptors include a first susceptor located in a receiving portion configured to accommodate a cigarette, a second susceptor arranged spaced apart from the first susceptor, and a third susceptor arranged spaced apart from the first susceptor and the second susceptor; and
- determining whether a cigarette is accommodated based on a first temperature profile of the second susceptor and a second temperature profile of the third susceptor, wherein the third susceptor is arranged in the side wall of the receiving portion.

14. A non-transitory computer-readable recording medium having recorded thereon a program for executing the method of claim 13 on a computer.

* * * * *